March 7, 1950     C. J. GLANZER ET AL     2,499,949
FILTER PANEL
Filed July 19, 1945     2 Sheets-Sheet 1

INVENTORS
CLARENCE J. GLANZER
OLIVER H. SCHAAF
BY Hyde and Meyer
ATTORNEYS

March 7, 1950     C. J. GLANZER ET AL     2,499,949
FILTER PANEL
Filed July 19, 1945     2 Sheets-Sheet 2
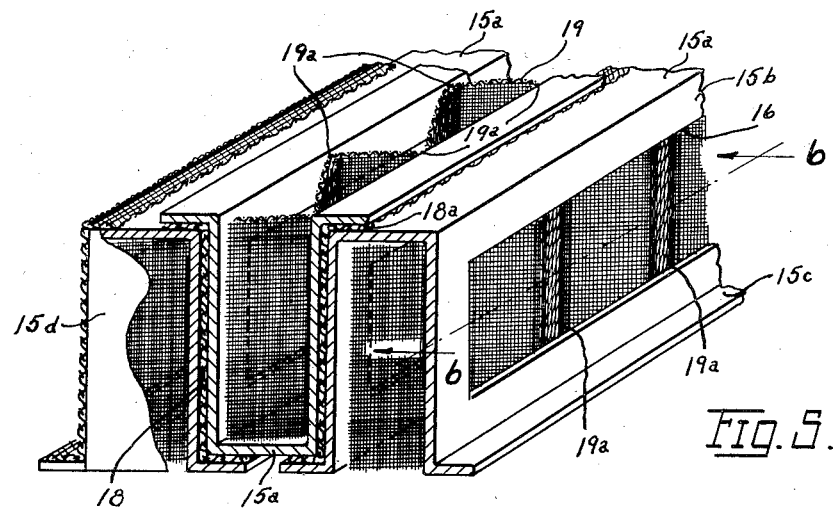
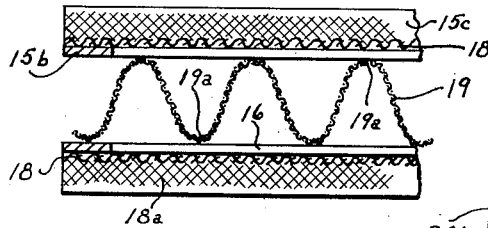
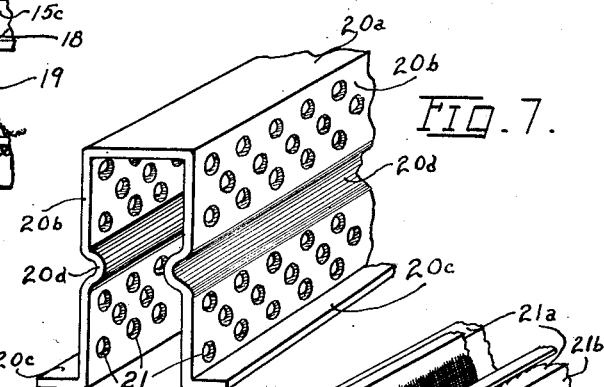
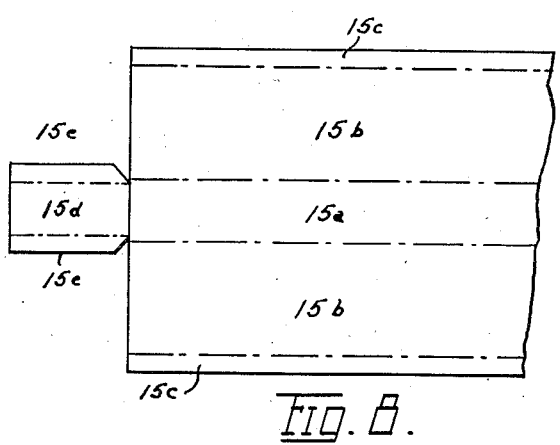
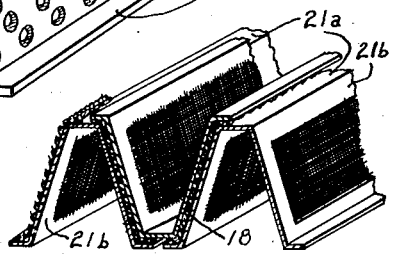
INVENTORS.
CLARENCE J. GLANZER
OLIVER H. SCHAAF
BY Hyde and Meyer
ATTORNEYS.

Patented Mar. 7, 1950

2,499,949

UNITED STATES PATENT OFFICE 2,499,949

FILTER PANEL

Clarence J. Glanzer, Northfield, and Oliver H. Schaaf, Shaker Heights, Ohio, assignors to Air-Maze Corporation, Cleveland, Ohio, a corporation of Delaware Application July 19, 1945, Serial No. 605,878

3 Claims. (Cl. 183—70)

This invention relates to improvements in a filter panel often referred to in the trade as of the "dry type" wherein one or more strips of filter material is supported in a manner to retain particles collected from a dirt-bearing gaseous stream, the filter material being removable for separate cleaning or for replacement.

An object of the present invention is to provide a novel arrangement of subframes or cells adapted to be assembled in plural in a panel to support filter material, and easily disassembled for removal or replacement of the filter material.

Another object of the invention is to provide a device as above-described wherein the cells are of uniform construction and capable of assembly in a complete unit by simply reversing the position of every other cell.

Another object of the present invention is to provide a novel manner of sealing the cells and the holding frame against gaseous leakage by use of the filter material itself.

Another object of the invention is to provide novel filter-supporting structure associated with the cells.

Still another object is the provision of novel reinforcement for the cells over a considerable span so as to prevent sagging of the cells or of the filter material held thereby.

Other objects and advantages of our invention will be apparent from the accompanying drawings and description, and the essential features thereof will be set forth in the appended claims.

In the drawings,

Fig. 5 is a perspective view similar to Fig. 4 and showing another modified form of our device;

Fig. 6 is a sectional view taken along the line 6—6 of Fig. 5;

Fig. 7 is a perspective view of a cell subframe taken from the position similar to Fig. 2 and showing still another modified form;

Fig. 8 is a plan view of a sheet blank which might be used in forming certain of the cells previously described; while Fig. 9 is a small perspective view similar to Figs. 4 and 5 showing still another modification of our invention.

Certain filtering problems are best met by means of a strip of filter material properly supported in the gaseous stream in a manner to receive dirt particles and hold the same, after which the dirty strip is removed either to be cleaned and reused or to be thrown away and replaced by a new strip. In this type of filter the strip material is quite often dry although there is no reason why our invention might not be used with strip material coated with some viscous adhesive for holding the dirt particles where they impinge upon the filter media. The strips of filter material hereinafter referred to will be understood to be of any suitable medium. Quite often they are of porous cloth, paper or the like, but any other flexible porous filter material might be used where required for a special filtering job.

Figure 1:
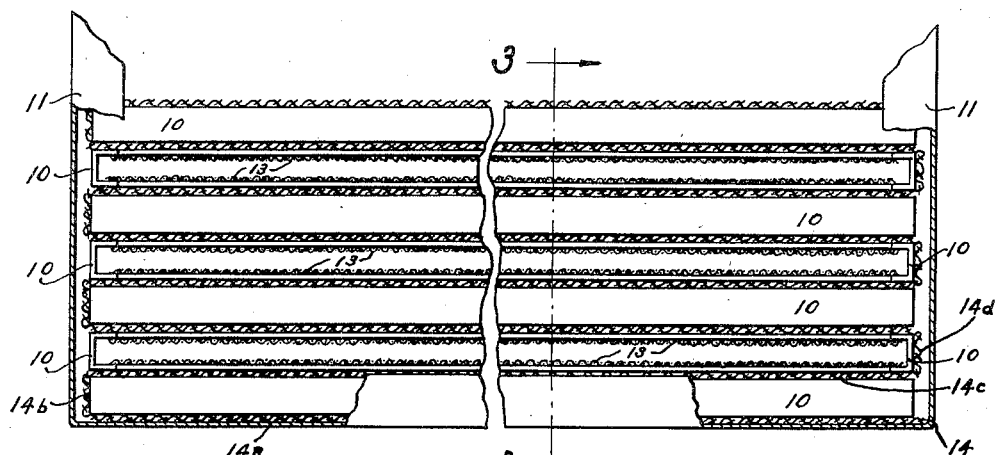
Fig. 1 is a front elevational view of a filter panel constructed according to our invention with portions of the panel frame broken away to more clearly show the construction.
Figure 2:
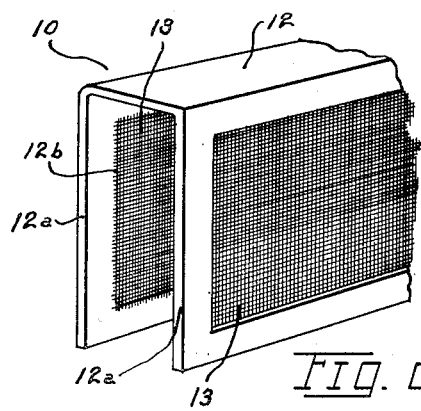
Fig. 2 is an enlarged perspective view of the end portion of one of the cells of Fig. 1.
Figure 3:
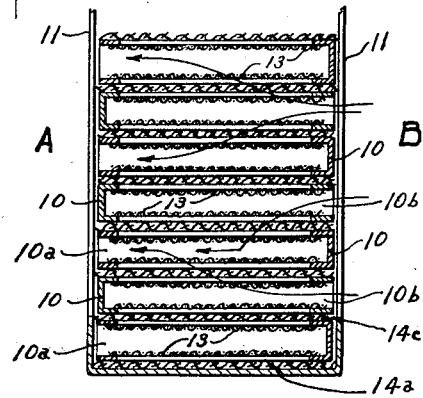
Fig. 3 is a transverse sectional view taken along the line 3—3 of Fig. 1.

In the device shown in Figs. 1, 2, and 3, a plurality of generally U-shape subframes 10 are piled one on top of the other within the holding frame 11 with the open side of the cells marked 10a turned toward the face A of the panel and the open side 10b of the alternate cells turned toward the face B of the panel. Referring more particularly to Fig. 2, it will be noticed that each of the subframes comprises an imperforate central web 12 with side flanges 12a extending at right angles therefrom and forming the legs of the U-form cell. It will be noted that the major portion of the legs 12a are foraminous, and in this particular form of our device, this is provided by cutting the openings 12b to form windows extending over the major portion of the area of the cell sides and securing a sheet of screen material 13 across these windows to support the filter material as will presently appear.

Referring now to Fig. 1, with a plurality of the subframes 10 available, a strip of filter material 14 is placed along the bottom of the frame 11 extending over the entire side of the frame from front to rear and from side to side along the stretch of material 14a as clearly seen in Figs. 1 and 3. The bottom cell 10 is then placed on the strip 14a with its open side 10a toward the face A of the filter panel. The strip of filter material is then folded vertically upward around the open end of the cell at the point 14b as seen in Fig. 1. Another stretch 14c of the material is then folded back across the entire length and width of the panel parallel to the stretch 14a after which the next cell 10 is placed on the strip 14c with its open side 10b facing toward the panel face B. The filter strip is then folded around the open end of this second cell 10 at the point 14d, and this operation is continued folding the strip of filter material back and forth across the panel between every two adjacent cells or subframes 10. Thus a continuous strip of filter material may be folded into one complete panel making it very easy to assemble and disassemble the device and to clean or replace the filter material. A later description will show how separate strips may be used at 14a, 14c, etc. if necessary or desirable.

In the device just described, a dirt-bearing gaseous stream will be compelled to enter through the face B of the panel (when the same is placed in a suitable duct), and following the arrows will travel through the cell openings 10b, then through the screens 13 which support the filter strips across their entire area, then through the filter strips 14a, 14c, etc., and then out through the cell openings 10a on the downstream side (face A) of the panel.

Figure 4:
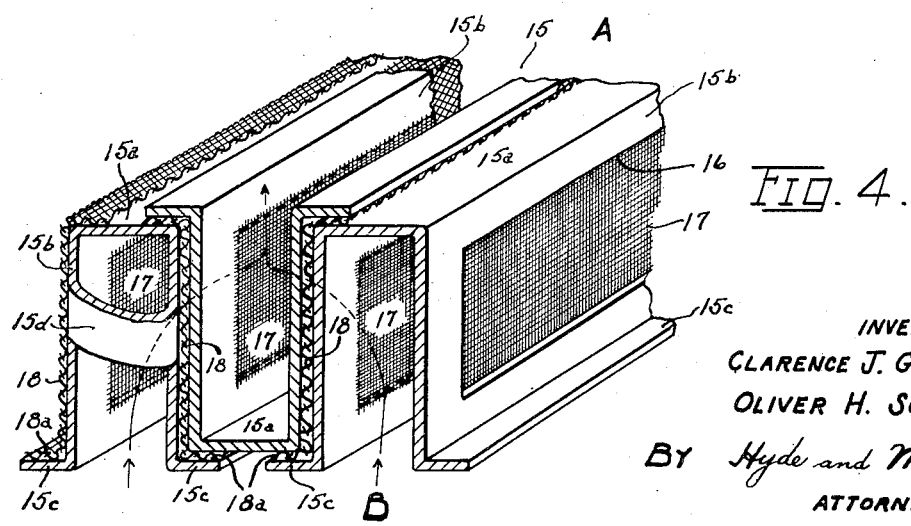
Fig. 4 is an enlarged perspective view of the end portions of several cells of modified form with certain parts of the subframes broken away to more clearly show the construction.

In the modification of Fig. 4, the construction is in most respects similar to that already described with the following differences. Here each of the cells 15 has an imperforate central web 15a and parallel side walls 15b extending at right angles thereto but provided at the free ends of the U-form section with flanges 15c extending outwardly at right angles to the side walls 15b. Preferably also, the ends of the cells are closed by an imperforate end wall 15d as shown broken away in Fig. 4. Here again the side walls 15b are provided with the windows 16 which are covered by the screen material 17. A plurality of these cells, all of which are identical as shown, are assembled in a fashion similar to that described in connection with Figs. 1 and 3 with the open side of every other cell toward the face B of the panel and the intermediate cells having open sides facing toward the face A. Here, however, the strip of filter material 18 is wider than the dimension of the side wall 15b between the web 15a and the flange 15c. As clearly shown in Fig. 4, the strip of filter material is wide enough to provide marginal edges 18a which lie between each of the flanges 15c and the web 15a of an adjacent cell or subframe. In this manner, leakage of the gaseous stream or bypassing these overlapping points is prevented.

It will also be noted that the flanges 15c provide stiffening members along the longer dimension of the cells 15 so as to prevent sagging of the walls 15b in the center of the span in cases where the panel is of considerable width. The form shown in Fig. 5 is exactly like that shown in Fig. 4 except that windows 16 in the side walls 15b are left open. In this modification, means is provided for supporting the strip 18 of filter material across the area of the windows 16 by placing a length of stiff screen material 19 bent in zig-zag form as clearly shown in Figs. 5 and 6 in each U-shape cell. The screen 19 preferably extends substantially the full depth of each cell resting on the wall 15a thereof and having the ridges 19a of the screen pressed against the side walls 15b of the cells. These ridges 19a may be spaced sufficiently close together to provide a firm support for the filter strip 18 entirely across the width of the panel. At the same time, the screens 19, each of sufficiently stiff material, provide a certain rigidity preventing collapse of the parallel side walls 15b of each cell. This is in addition to the stiffening effect of the flanges 15c referred to in connection with Fig. 4.

Another manner of forming the subframes is indicated in Fig. 7 wherein a single sheet of metal or the like is bent in U-form to provide the central web 20a having parallel side walls 20b substantially at right angles to the web 20a. At the open side of the cell, the flanges 20c may be turned outwardly from the side walls as previously described in connection with the flanges 15. The side walls may be perforated as indicated at 21 to provide for flow of a gaseous stream therethrough and to support the filter strip 14 or 18 in a manner previously described in connection with the other modifications. If desired, the stiffening deformations, such as the ribs 20d, may be provided in the side walls 20b extending crosswise of the panel to prevent sagging of the subframe in the central portion of the panel.

Where the cells have closed ends, as indicated at 15d, there is no problem of gas leakage. Where the ends are open, the reliance may be had upon a filter strip 14 or 18 of soft cloth material which will rest snugly between the side wall 11 of the panel frame and the open end of the cell so as to provide a very good closure at that point.

Where the open end of the cell is closed as by the wall 15d, each cell may be formed of a single blank of sheet material as indicated in plan in Fig. 8. Here the web 15a, the side walls 15b, and the flanges 15c are laid out on a sheet of material to which the end wall 15d may be integrally attached as indicated in Fig. 8. It is obvious how this blank may be folded on the dot-dash lines indicated to give a cell like that shown in Fig. 4. For ease in attaching the end wall 15d to the side walls, the flanges 15e may be provided folded at right angles to 15d and attached to the side walls 15b in the completed form.

While the various forms of our device have been thus far described as providing a central web such as 12 or 15a and parallel side walls at right angles thereto, it should be understood that we contemplate other forms of our device such as that shown diagrammatically in Fig. 9. Here the imperforate web 21a is provided with side walls 21b diverging therefrom and alternate cells open in opposite directions to carry out the same construction as previously described. It is obvious that identical cells may be used facing upstream and downstream with the filter strip 18 placed between adjacent side walls 21b to provide the same filter effect as in the cases where the cell side walls are parallel.

While we have described the use of a single strip of filter material 14 or 18, it is obvious that individual lengths of material, as shown at 14a or 14d, might be provided without departing from the spirit of our invention. We find, however, that it is more difficult to handle a large number of separate strips and, therefore, we prefer one continuous strip or at least a strip long enough to make several lengths of material back and forth across the panel.

What we claim is:

1. A filter panel having upstream and downstream faces and comprising a main frame, separate hollow subframe members wholly unconnected with said main frame, one member providing a cell open at said upstream face only for stream ingress and adjacent members providing cells open at said downstream face only for stream egress, said subframe members being identical in shape but in alternately reversed position, said cells having walls providing stream flow between them, flexible sheet filtering material between adjacent cell walls and filling the stream flow space between them, and a stiff foraminous sheet folded in zig-zag form inside of each cell and engaging the walls thereof and said flexible sheet filtering material, whereby to support said cell walls and to hold said filtering material in place.

2. A filter panel having upstream and downstream faces and comprising a main frame surrounding the sides of said panel and open at said faces, said frame being channel form in section having an imperforate web and flanges overlying said faces, separate hollow subframe members wholly unconnected with said main frame, one member providing a cell open at said upstream face only for stream ingress and adjacent members providing cells open at said downstream face only for stream egress, said subframe members being identical in shape but in alternately reversed position, said subframe members extending from said frame web on one side to said frame web on the opposite side, said cells having walls providing stream flow between them, flexible sheet filtering material between adjacent cell walls and filling the stream flow space between them, said flexible sheet extending between said subframe members and said frame web for sealing purposes, and means supporting said flexible sheet filtering material and holding the same in said cell walls.

3. A filter panel having upstream and downstream faces and comprising a main frame surrounding the sides of said panel and open at said faces, separate hollow sub-frame members wholly unconnected with said main frame, each of said sub-frame members being of channel section and of a length to extend from side to side of said main frame, each of said sub-frame members having open side walls and an imperforate end wall and having out-turned flanges on said side walls at the open side of the channel, said sub-frame members being identical in shape and assembled in said main frame in alternately reverse position, one of said channels opening upstream and the adjacent channel on each side opening downstream, the out-turned flanges of one sub-frame member abutting against the end wall of adjacent sub-frame members, said sub-frame members completely filling said main frame, and flexible sheet filtering material between adjacent side walls of said sub-frame members, said sheet material extending between said flanges and end walls to provide sealing means there.

CLARENCE J. GLANZER.
OLIVER H. SCHAAF.

REFERENCES CITED

The following references are of record in the file of this patent:

UNITED STATES PATENTS

| Number | Name | Date |
|---|---|---|
| 991,572 | Weisenstein | May 9, 1911 |
| 1,850,101 | Greene | Mar. 22, 1932 |
| 1,944,407 | Dahlman | Jan. 23, 1934 |
| 2,198,189 | Vokes | Apr. 23, 1940 |
| 2,255,519 | Preston | Sept. 9, 1941 |
| 2,286,479 | Farr | June 16, 1942 |

FOREIGN PATENTS

| Number | Country | Date |
|---|---|---|
| 401,045 | Great Britain | Nov. 9, 1933 |